United States Patent [19]
Watkins

[11] Patent Number: 6,031,377
[45] Date of Patent: Feb. 29, 2000

[54] MAGNETIC ANOMALY DETECTION BUOY FOR DETECTING SUBMARINES

[76] Inventor: James A. Watkins, 111 A Tippett Rd., Lexington Park, Md. 20653

[21] Appl. No.: 08/463,130

[22] Filed: Jun. 5, 1995

[51] Int. Cl.[7] ............................ G01V 3/08; G01V 3/40; G01R 33/02
[52] U.S. Cl. .................... 324/345; 324/247; 324/226
[58] Field of Search .................... 324/301, 304, 324/226, 244, 247, 345

[56] References Cited

U.S. PATENT DOCUMENTS

| | | |
|---|---|---|
| 2,404,806 | 7/1946 | Lindsey . |
| 2,632,884 | 3/1953 | Murphy . |
| 2,834,000 | 5/1958 | Wiggins . |
| 3,226,670 | 12/1965 | Richard . |
| 3,263,161 | 7/1966 | Ruddock et al. . |
| 3,471,777 | 10/1969 | Rona ........................................ 324/247 |
| 3,720,909 | 3/1973 | Sikora . |
| 3,737,842 | 6/1973 | Bobrin . |
| 3,757,203 | 9/1973 | Salvi et al. . |
| 3,808,519 | 4/1974 | Lemercier et al. . |
| 4,208,738 | 6/1980 | Lamborn . |
| 4,938,136 | 7/1990 | Gould . |
| 5,189,368 | 2/1993 | Chase ........................................ 324/301 |

FOREIGN PATENT DOCUMENTS 0137579   6/1987   Japan ........................................ 324/345

OTHER PUBLICATIONS

John Clarke, Geophysical Applications of Squids, IEEE Transactions on Magnetics, vol. Mag–19, No. 3, May 1983.

*Primary Examiner*—Walter E. Snow

[57] ABSTRACT

A magnetic anomaly detection buoy includes an elongated body having a cavity disposed therein, a means for detecting a magnetic anomaly and producing an output in response thereto, and a means for maintaining the elongated body in a state of buoyant repose within a fluid medium. A radio transmitter, disposed within the cavity of the elongated body, for electrical communication with the detecting means. The radio transmitter receives the output from the means for detecting the magnetic anomaly and transmits a radio signal in response thereto. A method for detecting a magnetic field anomaly includes deploying a magnetic anomaly detection buoy into a large body of water and determining a first flux value representing the magnetic flux of the environmental magnetic field conditions. The first flux value is then stored for future reference. The environmental magnetic field conditions are evaluated and a second flux value is determined. If the second flux value is greater than the first flux value, information is transmitted via radio waves.

26 Claims, 9 Drawing Sheets

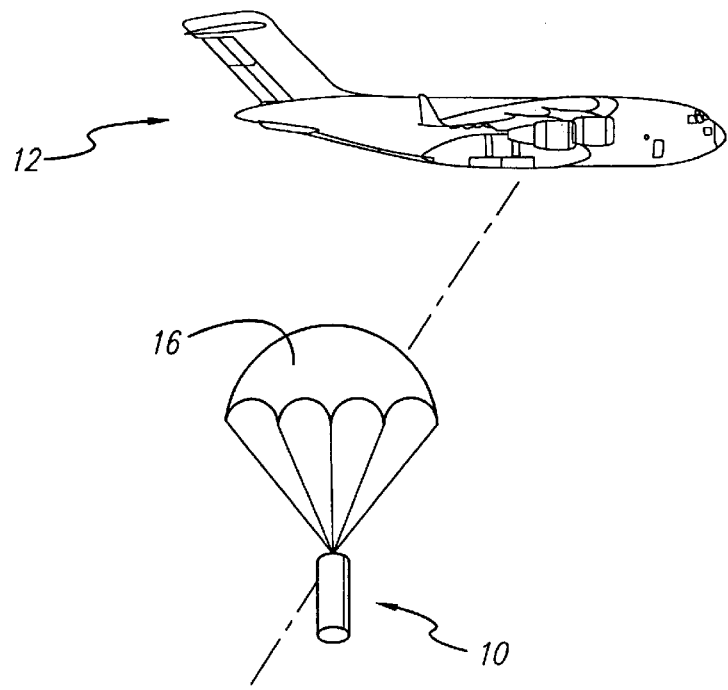
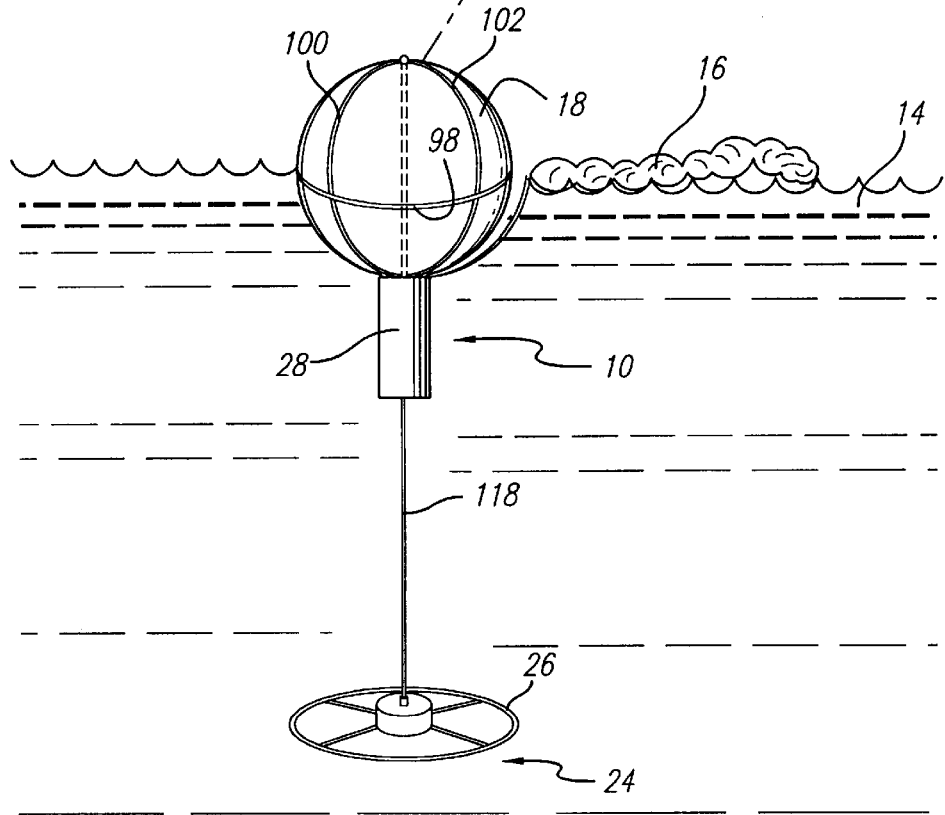
FIG. 1

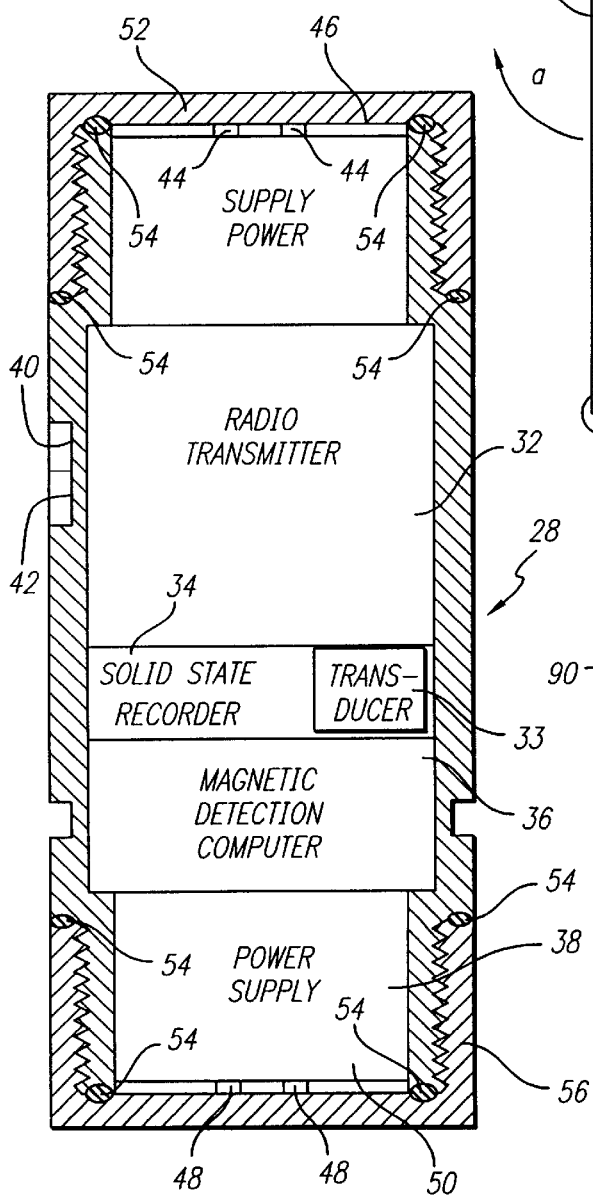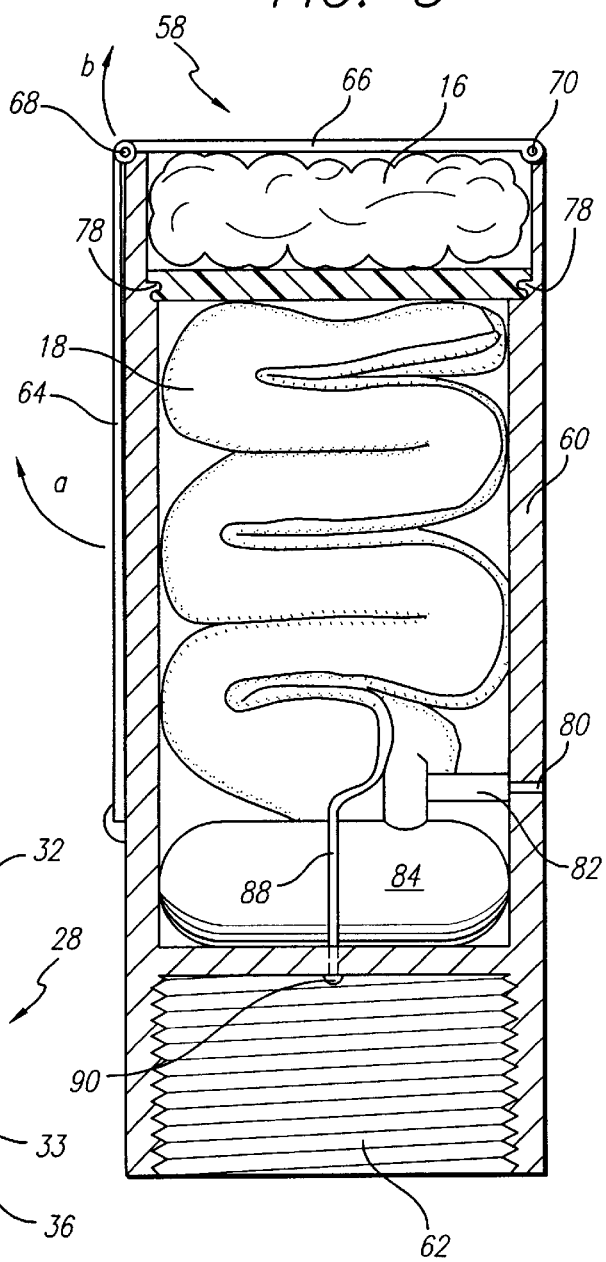

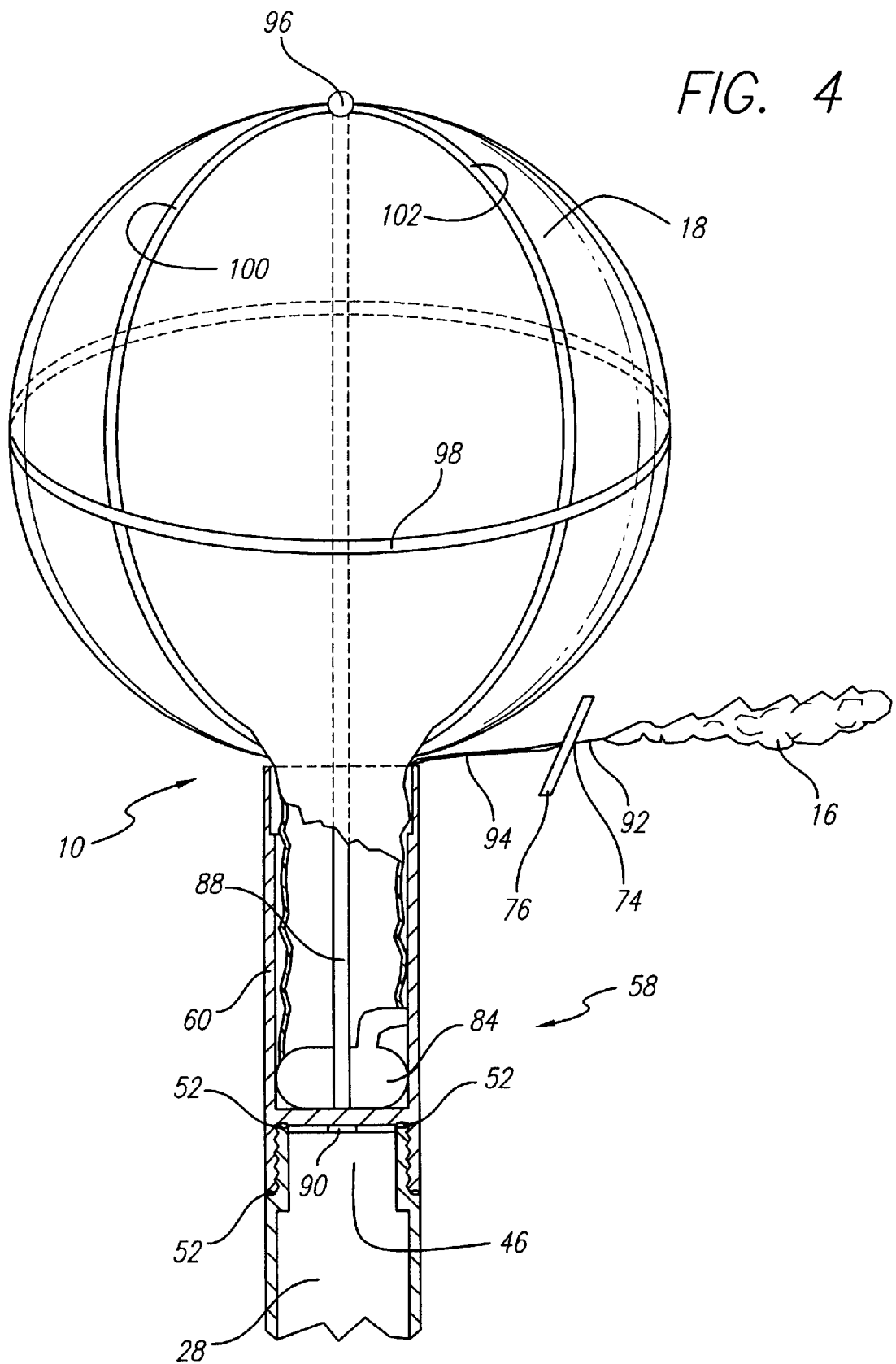

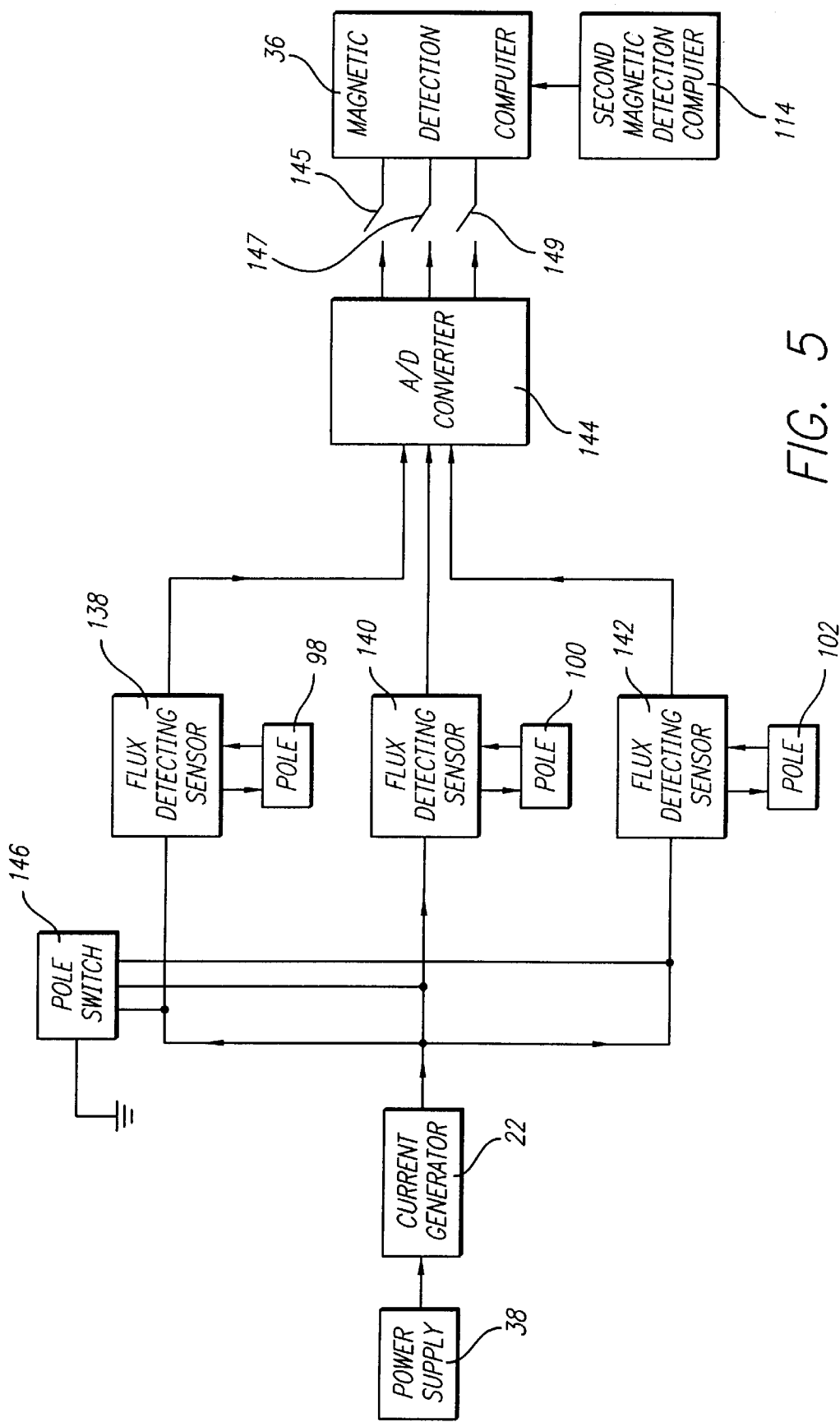

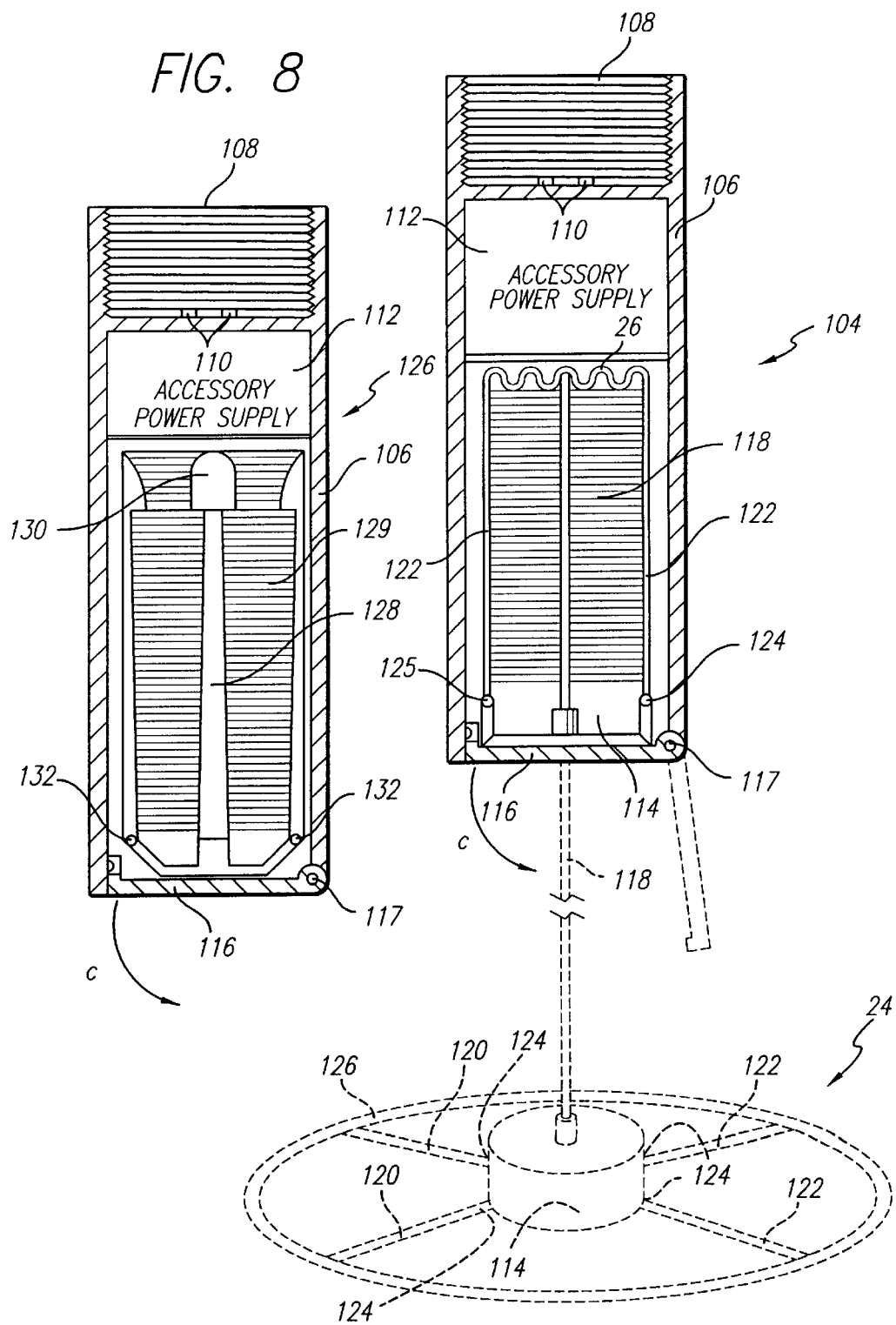

ORIGINAL STATUS MESSAGE: 15 SECONDS

| # | # | # | # | # | # | # |
|---|---|---|---|---|---|---|
| BUOY FREQUENCY CHANNEL # (EX. 1, 3, 5, ... 99) | BUOY # (001-999) | | ALL "000" (TO INDICATE ORIG. STATUS MESSAGE) | SUB EVALUATION | CHECK SUM | FUTURE USE |

ANOMALY DETECTION MESSAGE:

| # | # | # | # | # | # | # |
|---|---|---|---|---|---|---|
| BUOY FREQUENCY CHANNEL # (EX. 1, 3, 5, ... 99) | BUOY # (001-999) | STRENGTH OF ANOMALY | NUMBER OF TRANSMISSION (SEQUENTIAL 01-20) | SUB EVALUATION | CHECK SUM | FUTURE USE |

FIG. 11

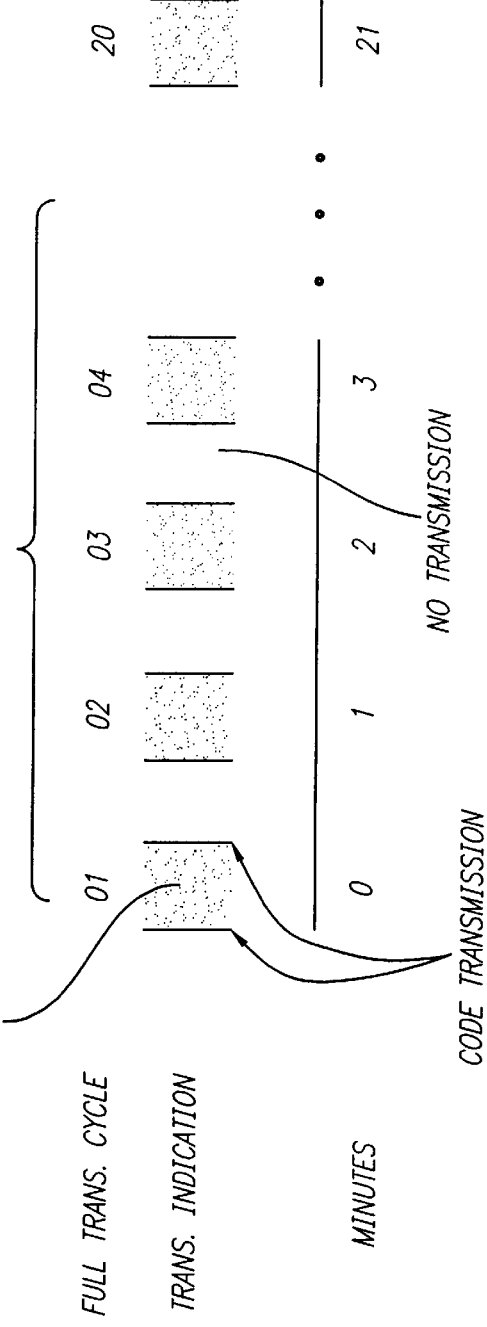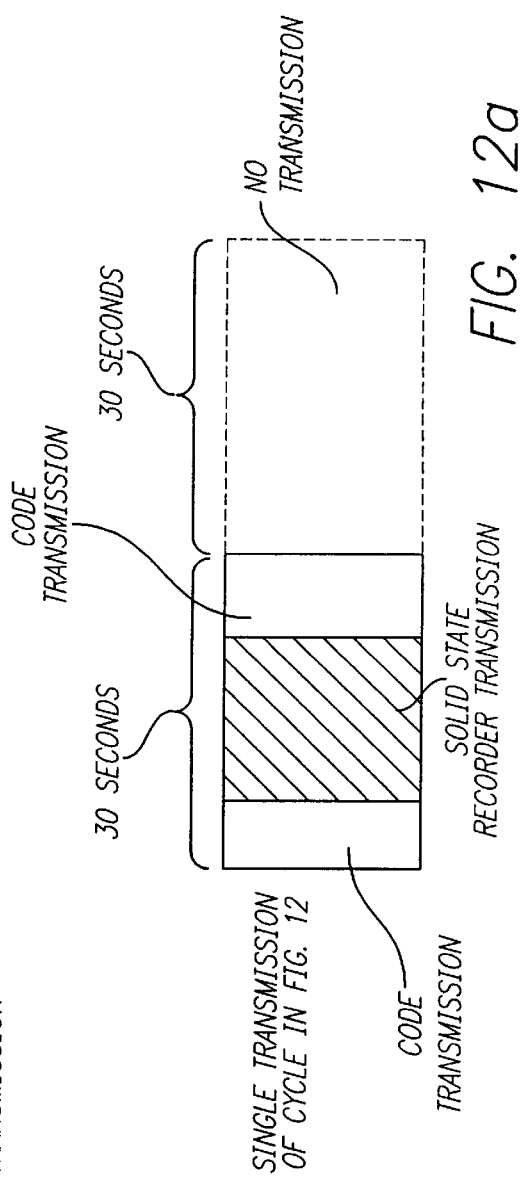

MAGNETIC ANOMALY DETECTION BUOY FOR DETECTING SUBMARINES

BACKGROUND OF THE INVENTION

The present invention relates to the field of anomaly detection. More particularly, the present invention relates to the field of buoyant and submersible anomaly detecting transducers which produce an electrical signal in response to the detection of an anomaly. Even more particularly, the present invention relates to a method and apparatus for buoyant and submersible anomaly detection which are responsive to an anomaly in the earth's magnetic field corresponding to a modern nuclear or diesel submarine.

Anti-submarine warfare has historically used two methods for detecting the presence of submarines. The first method incorporates a plurality of buoys or "sonobuoys" which are adapted to descry the sound or "acoustic signature" of a submarine. The second method utilizes an airborne magnetic field sensor, which is towed behind an aircraft, for detecting disturbances in the earth's magnetic field. These magnetic disturbances may be caused by large, metallic, underwater objects such as a submarines. Both prior methods are outlined below with each having respective advantages and disadvantages.

The first method or "sonobuoy" method incorporates a plurality of buoys which are adapted to be positioned in a two dimensional, geographical relation, at or near the surface of the ocean. Each sonobuoy continuously monitors sonic vibrations received from within the ocean and continuously transmits information corresponding to the sonic vibrations as radio signals. Sophisticated sound detection equipment or "hydrophones" detect the acoustical vibrations. Once the radio signals are received onboard a nearby aircraft, they are analyzed by a technician. The sonic vibrations as received and analyzed may potentially correspond to the acoustic signature of a modern nuclear or diesel submarine.

The acoustic signature of a submarine is produced by the engine, propeller, and internal mechanics of the submarine as it passes through the water. Each sonobuoy, once deployed, transmits all of the acoustical information received. This acoustical information may include the acoustical signature of a submarine. However, the sonobuoy method suffers from a disadvantage in that the acoustical information must be continually monitored by technical operators onboard a nearby aircraft. This necessitates that each sonobuoy be assigned to its own respective radio frequency for transmitting its signal to the aircraft. Further, the technical operators onboard the aircraft must undertake extensive training to recognize the acoustical signature of a submarine apart from the surrounding background noise. Unfortunately, the sonobuoy system suffers from the added disadvantage that the number of sonobuoys which may be deployed depends upon the number of radio frequency channels available for transmission. For example, the equipment onboard the aircraft may only support a limited number of frequency channels, such as 50 to 100, thus limiting the number of channels and therefore the number of buoys available for use. Thus, the sonobuoy method affords coverage of a relatively predetermined geographical area of the ocean but is limited by the number of buoys available.

A number of prior systems have been developed which utilize the sonobuoy detection method for detecting the presence of an underwater vehicle such as a submarine. Sikora, U.S. Pat. No. 3,720,909, incorporated herein by reference, discloses a directional hydrophone buoy system which produces an electrical signal in response to the sound pressure emitted from an underwater sound source, such as the propeller of a submarine. In the hydrophone buoy of Sikora, the buoy is given appropriate ballast such that the buoy is submersed below the surface of the water. A mass including a coil winding is suspended by springs within a local magnetic field, which is produced by permanent magnets. Sonic vibrations from the surrounding ocean produce a corresponding movement of the coil within the magnetic field and therefore a voltage output corresponding to the rate at which the coil moves, i.e. the amount of sound detected.

Richard, U.S. Pat. No. 3,226,670, incorporated herein by reference, discloses an apparatus for determining characteristics of the ocean bottom. According to Richard, a small radio telemetering buoy is dropped into the ocean from an aircraft. When the buoy falls into the water, a bag disposed on a distal end thereof is inflated. A radio antenna is suspended within the inflatable bag. An echo sounding system is employed by first electrically detonating an explosive charge by way of a delayed sea water switch. A hydrophone disposed within the telemetering buoy then receives an impulse from the detonated charge and relays the information to a nearby aircraft via radio signals.

It thus appears that the sonobuoy method offers the advantage of placement over a relatively predetermined ocean area for submarine detection. However, the sonobuoy method suffers from the disadvantage of size limitation i.e., the acoustic detection equipment takes up a large physical area. The sonobuoy method also suffers from the requirement of a separate radio frequency channel for each sonobuoy, and the requirement that highly trained operators must continually monitor all received signals from the sonobuoys. Additionally, the limited number of radio channels available onboard the aircraft effectively limits the number of sonobuoys deployed and thus the geographical area of coverage.

The second method for detecting submarines utilizes an airborne magnetic field sensor which is suspended behind an aircraft such as an airplane or helicopter. The airborne magnetic field sensor detects an anomaly in the earth's magnetic field and then communicates this information to the aircraft for analysis. Airborne magnetic field sensors have also been employed for detecting geological noise effects produced by the varied shape of the sea floor. The airborne sensor method generally requires a large power source for detecting the presence of a submarine far below the ocean surface.

The airborne sensor method provides the advantages of maneuverability and that the course of search may be readily changed. Further, this method is not limited by the number of buoys that may be housed by an aircraft. However, this method suffers from the disadvantage of limited swath width and thus cannot readily and simultaneously cover a wide two dimensional area.

Murphy, U.S. Pat. No. 2,632,884, incorporated herein by reference, discloses an orienting mechanism for magnetic detector devices or magnetic field sensors. As disclosed, a body or bird is towed behind an aircraft by way of a cable or the like. A magnetic field sensor having three mutually perpendicular axes is enclosed within the bird. One of the sensors or coils is selected as a detector coil and is adapted to be maintained in alignment with the lines of force of the earth's magnetic field, for example by servo motors. The other axes are placed mutually perpendicular thereto.

Each of the airborne magnetic field sensors must be supported by a dedicated aircraft. Thus the magnetic field sensor method offers the advantage of portability, however it provides a relatively narrow area of coverage when compared with the sonobuoy method.

Heretofore, the range of sound detection has been far superior to that of magnetic anomaly detection, given the same power requirements. However, with the advent of quieter and quieter submarines, the effective range of sonobuoy detection has become considerably weakened. These technological advances in the art of quieting submarines have not been economically addressed by the advances in the art of acoustical search sensing. Thus, modern submarine detection has become an increasingly difficult exercise.

SUMMARY OF THE INVENTION

Accordingly, it is an object of the present invention to provide a buoyant and/or submersible buoy which incorporates magnetic anomaly detection. It is a further object to provide a magnetic anomaly detection buoy which is smaller than prior sonobuoys and which provides an equivalent or greater field of coverage.

It is a further object of the present invention to provide a buoyant and/or submersible buoy which requires significantly less physical space than prior art buoys.

It is a further object of the invention to provide a buoyant and/or submersible buoy which does not require continuous monitoring by a trained technician to determine the presence of a modern nuclear or diesel submarine.

It is still a further object of the invention to provide a buoyant and/or submersible buoy system which does not require a significant number of separate radio channels for operation.

It is still a further object of the invention to provide a buoyant and/or submersible buoy system which is compatible with existing aircraft monitoring systems and which may take advantage of previously outdated equipment for submarine detection.

The present invention achieves some of the above-mentioned objects by utilizing the magnetic signature of a target submarine as an indication means for detection while only transmitting a radio signal upon detecting a possible contact.

A magnetic anomaly detection buoy according to the present invention includes an elongated body having a cavity disposed therein, a means for detecting a magnetic anomaly and producing an output in response thereto, and a means for maintaining the elongated body in a state of buoyant repose within a fluid medium. The magnetic anomaly detection buoy preferably includes a radio transmitter, disposed within the cavity of the elongated body, which is in electrical communication with the detecting means. The radio transmitter receives an output from the detecting means upon the detection of a magnetic anomaly and transmits a radio signal in response thereto.

A preferred embodiment of the magnetic anomaly detection buoy includes a solid state recorder which may be disposed within the cavity of the elongated body. The solid state recorder electrically communicates with the detecting means; and in response to a received output therefrom, records a solid state signal corresponding thereto.

A first pole is physically connected to the elongated body at a distal end thereof for detecting magnetic anomalies within the surrounding magnetic field. Second and third poles are also connected thereto. A first magnetic detection computer disposed within the cavity of the elongated body is electrically coupled to the first, second and third poles for receiving respective first, second and third magnetic field information therefrom. The first, second and third poles are mutually orthogonal for pin-pointing magnetic anomalies in Euclidian space. A fourth antenna pole is physically connected to the elongated body at a proximal end thereof via an elongated tension member. The elongated tension member is preferably an elongated electrical cable which is shielded with an insulating barrier. The fourth antenna pole allows the magnetic detection computer to distinguish submersed magnetic anomalies, i.e. submarines, from non-submersed magnetic anomalies, i.e. surface ships.

A second magnetic detection computer is physically connected to the fourth antenna pole and the elongated body via said elongated tension member. The second magnetic detection computer is electrically coupled to the fourth antenna pole for receiving magnetic field information therefrom and electrically coupled with said first magnetic detection computer for transmitting the magnetic field information thereto.

The magnetic anomaly detection buoy incorporates a hollow, inflatable float having three electrical wire rings orthogonally disposed about the periphery thereof. Each of the electrical rings is respectively the first, second, and third antenna poles. A fluid cartridge releases compressed gas into the inflatable float for inflation thereof. A radio antenna (separate and apart from the electrical poles) is electrically coupled with the radio transmitter to transmit the magnetic field information as a radio signal in response to a signal from the first magnetic detection computer. The radio antenna is disposed within the inflatable float.

A method for detecting a magnetic anomaly includes as a first step, deploying a magnetic anomaly detection buoy into a large body of water. Next, upon deployment of the buoy, the environmental magnetic field conditions are evaluated for a predetermined period of time. A first flux value representing an average or threshold magnetic flux of the environmental magnetic field conditions is determined. This first flux value is then stored for future reference.

After storing the first flux value, the environmental magnetic field conditions are evaluated again and a second flux value is determined. The second flux value is then compared with the stored flux value. If the second flux value exceeds the first flux value, then magnetic anomaly detection information is transmitted from the buoy to a nearby aircraft via radio waves.

Other objects and many of the antecedent advantages will be readily appreciated as the subject invention becomes better understood with reference to the following detailed description of the preferred embodiments taken in conjunction with the accompanying drawings.

BRIEF DESCRIPTION OF THE DRAWINGS

FIG. 1 is a perspective view of a magnetic anomaly detection buoy being dropped from an aircraft according to an embodiment of the present invention.

FIG. 2. is a side sectional view of a basic unit of the magnetic anomaly detection buoy.

FIG. 3 is a side sectional view of a float accessory which may be attached to the top of the basic unit.

FIG. 4 is a partial side sectional view of the float accessory of FIG. 3 in which the float is fully inflated.

FIG. 5 is a diagram indicating electrical connection between the magnetic detection computer and the magnetic detection poles.

FIG. 6 is a side sectional view of a submarine evaluation accessory which may be attached to the bottom of the basic unit.

FIG. 8 is a side sectional view of a shallow water anchor which may be attached to the bottom of the basic unit.

FIG. 11 shows a single coded transmission in accordance with the present invention.

FIG. 12 shows a full transmission cycle in accordance with the present invention.

FIG. 12a shows a single transmission cycle of FIG. 12.

DETAILED DESCRIPTION OF THE INVENTION

Figure 7:
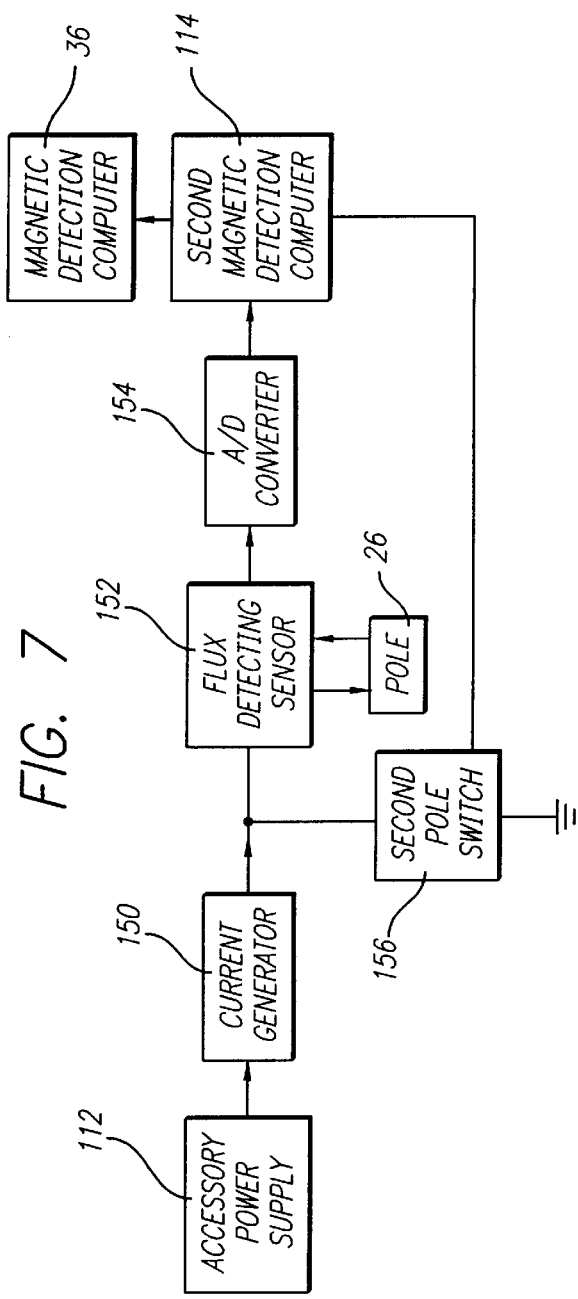
FIG. 7 is a diagram indicating electrical connection between the second magnetic detection computer and a distal pole.

With reference now to the drawings, and more particularly to FIG. 1, an embodiment of the present invention is disclosed and shown. FIG. 1 shows a magnetic anomaly detection buoy 10 being dropped from aircraft 12 and subsequently landing in ocean 14. Magnetic anomaly detection buoy 10 is connected with a parachute 16 to reduce the velocity of the buoy 10 during decent thereof.

Referring again to FIG. 1, after buoy 10 hits the ocean surface and is submerged therein, inflatable float 18 is deployed to maintain buoy 10 in buoyant repose. It should be appreciated that the magnetic anomaly detection buoy 10 will penetrate the ocean surface before the float 18 is actually deployed. Float 18 is shown with a plurality of magnetic field detecting poles which are referenced as horizontal coil 98, x-axis coil 100, and y-axis coil 102. The magnetic field detecting coils detect the surrounding magnetic field.

A fourth magnetic field detecting pole, referenced as distal coil 26, is disposed well below basic unit 28 as part of distal coil assembly 24. Distal coil 26 is connected to basic unit 28 through elongated tension member 118. A radio antenna (not shown in FIG. 1) is disposed within float 18 to effect radio communication with aircraft 12. Buoy 10 is given appropriate ballast such that float 18 is partially submerged within the ocean 14. This allows radio communication with aircraft 12 while reducing buoy drift caused by wind effects. Parachute 16, which is attached to buoy 10 and disposed along a side thereof, acts as a sea anchor to reduce drift.

Referring now to FIG. 2, a more detailed sectional view of basic unit 28 is shown. Basic unit 28 is adapted to house radio transmitter 32, solid state recorder 34, power supply 38, and magnetic detection computer 36. Solid state recorder 34 may optionally be provided as part of submarine evaluation accessory 104 (discussed below). As shown, on/off switch 40 is disposed along the side of basic unit 28 for activating the unit. An activation indicator 42, preferably in the form of a light emitting diode, is also disposed along the side of basic unit 28 for indicating that the unit has been activated and that power supply 38 is sufficiently charged.

Top end electrical contacts 44 are disposed at top end 46 of basic unit 28. In like regard, bottom end electrical contacts 48 are disposed at bottom end 50 of basic unit 28. To provide safety during storage and transportation, top end cap 52 is firmly secured over top end 46 with moisture resistant 0-rings 54. Likewise, bottom end cap 56 is firmly secured over bottom end 50 with moisture resistant O-rings 54.

Radio transmitter 32 is electrically connected with magnetic detection computer 36 for receiving an electrical signal output therefrom. Radio transmitter 32 then transmits the received signal as a radio signal which is output to top end electrical contacts 44. Radio transmitter 32 is electrically connected to and thereby powered by power supply 38. In the preferred embodiment, an antenna (not shown in FIG. 2) is connected to top end electrical contacts 44 thereby permitting radio transmitter 32 to transmit magnetic anomaly information. Radio antenna contacts 44 are schematically shown at the top side of radio transmitter 32 (above top end 46). In an alternative embodiment, the detected information signal may be indicated by a strobe light or by an emission of smoke.

Solid state recorder 34 (which is an optional accessory) is part of the preferred embodiment and is shown adjacent to radio transmitter 32. Solid state recorder 34 may be either digital or analog and is configured to record acoustical information received from the ocean through a hydrophone (not shown). Solid state recorder 34 begins to receive the acoustical information upon receipt of an activation signal from magnetic detection computer 36. The acoustical information stored in solid state recorder 34 is then transmitted via radio transmitter 32 according to a predetermined protocol.

Power supply 38 is a battery for chemically storing electrical power. Power supply 38 is preferably a long-life lithium or nicad type battery, however, a number of varying types of power supplies could be used by those skilled in the art.

Turning now to FIG. 3, standard float accessory 58 is shown and described. Standard float accessory 58 includes an elongated cylindrical tubular housing 60. Threaded recess 62 is provided at a proximal end thereof and is adapted to be secured to top end 46 of basic unit 28. O-rings 54 will be retained about top end 46 of basic unit 28 upon removal of top end cap 52 and subsequent connection with threaded recess 62. Threaded recess 62 is cut such that tubular housing 60 may be manually attached to top end 46 of basic unit 28 without the application of special tools.

Standard float accessory 58 incorporates a fin 64 along a side thereof which is preferably made of plastic. Fin 64 may optionally fit within a recess in tubular housing 60 and is configured to catch the wind upon deployment from an aircraft. Fin 64 pops open top lid 66 by way of first joint 68 and second joint 70. Arrows "a" and "b" are provided in FIG. 3 to illustrate the movement of fin 64 and top lid 66. Upon release of top lid 66, which is provisionally held in place through a weak adhesive, parachute 16 is drawn out of tubular housing 60. Buoy 10 then continues its rapid decent towards the earth's surface thereby allowing parachute 16 to fill with wind. Parachute 16 subsequently deploys and thereby reduces the velocity of the buoy during decent towards earth. Parachute 16 is connected with standard float accessory 58 via connection point 74. The force exerted upon connection point 74 by parachute 16 during decent thereof is not sufficient to pull barrier 76 out from its connecting nubs 78.

As buoy 10 hits the ocean 14, it begins to sink toward the bottom. However, pressure activated piston 80 detects a change in pressure and subsequently controls release valve 82 to open, thereby releasing stored gas from compressed air cartridge 84 into inflatable float 18. During assembly, float 18 has been packed into tubular housing 60 and sealed with barrier 76. Once the compressed gas from compressed gas cartridge 84 is released into float 18, float 18 begins to expand thus pushing barrier 76 out from its secured location about nubs 78.

Flexible radio antenna 88 is disposed within inflatable float 18. Flexible antenna 88 is connected through a closed end of cylindrical tubular housing 60 and thereby forms an electrical connection with electrical contacts 90. Electrical contacts 90 are centrally positioned to contact top end electrical contacts 44 disposed on top end 46 of basic unit 28.

With reference now to FIG. 4, the fully inflated float 18 is shown and described. Standard float accessory 58 is shown with float 18 fully inflated. As shown, parachute 16 remains attached to contact point 74 through parachute lines 92. Parachute 16 thus acts as a sea anchor to reduce drift of buoy 10. All parts of buoy 10 remain attached to thereby reduce the number of pieces of debris in the ocean after use. Barrier 76 also remains attached to the inside of tubular housing 60 through barrier contact line 94.

FIG. 4 also shows tubular housing 60 attached to top end 46 of basic unit 28. As shown, flexible radio antenna 88 is electrically connected to electrical contacts 90 and physically connected to the top of float 18 at antenna/float contact point 96. Contact point 96 retains antenna 88 in a generally linear and upright position above the surface of the ocean 14 so that radio communication may be initiated with an aircraft, such as aircraft 12.

As shown, three magnetic field sensing coils respectively: horizontal coil 98, x-axis coil 100, and y-axis coil 102 are circularly provided about the periphery of float 18. X-axis coil 100 and y-axis coil 102 are each disposed in their own respective planes with both planes disposed in an orthogonal relation. Horizontal coil 98 is orthogonal to both the x-axis coil 100 and y-axis coil 102 such that magnetic anomalies in three dimensional space may be detected.

Each of the magnetic field sensing coils is provided with a respective electrical current running therethrough. The earth's magnetic field will cause a shift in the respective electrical currents which is detected and measured. As a large metallic object, such as a submarine, passes in close proximity to magnetic anomaly detecting buoy 10, a localized disturbance in the earth's magnetic field will become apparent. This localized disturbance is thus detected by the above-mentioned magnetic field sensing coils. Relative disturbances may be detected and analyzed by the magnetic detection computer 36. Accordingly, such indication of large disturbances in the earth's magnetic field are transmitted via radio waves through flexible antenna 88.

With reference now to FIG. 5, a more detailed relationship between the magnetic detection computer 36 and poles 98, 100 and 102 is described. Power supply 38 provides power to current generator 22. Current generator 22 may be simply a resistor to limit the amount of voltage across the poles or may be a more sophisticated circuit in which the current is regulated before output therefrom. Current is output from current generator 22 and transmitted about each of the poles 98, 100 and 102 via flux detecting sensors 138, 140 and 142. Flux detecting sensors transmit and regulate the amount of current which is transmitted about each of the respective poles 98, 100 and 102 for detection of the magnetic field.

The current fluctuations, if any, are next sent to analog-to-digital converter 144. Analog-to-digital converter 144 translates the analog current fluctuations into digital information and then transmits the digital information to magnetic anomaly detection computer 36.

Detection computer 36 controls poles 98, 100 and 102 with pole switches, 147, 149. Pole switches, 147, 149 are used to disengage poles 98, 100 and 102 during periods of radio transmission as indicated. Detection computer 36 will instruct pole switch 146 to ground any pole which is indicates that it is not attached or that it is sending erroneous information. Detection computer 36 is also connected with second magnetic anomaly detection computer 114 for receiving information regarding the fourth pole.

The present invention provides for other embodiments incorporating other magnetic anomaly detecting transducers in place of poles 98, 100, 102, and 26. In a first alternative embodiment, the poles are replaced by a superconducting quantum interference device or SQUID. An application of a SQUID is disclosed by Clarke, *Geophysical Applications of SQUIDS*, IEEE Transactions on magnetics, Vol MAG-19, No. 3, May 1983, which is incorporated herein by reference. In the first embodiment, each of the poles is replaced by respective SQUIDS, each of which having been present to detect magnetic anomalies in mutually orthogonal planes of Euclidian space.

With reference now to FIG. 6, a more detailed view of distal coil assembly 24 is shown. Fourth magnetic field detecting coil 26 is also illustrated along with submarine evaluation accessory 104. As shown, submarine evaluation accessory 104 is formed from a generally cylindrical tubular housing 106 which is adapted to rotationally connect with bottom end 50 of basic unit 28 via threaded receptacle 108. A plurality of electrical contacts 110 are disposed within the threaded receptacle 108 for contact with bottom end electrical contacts 48 from basic unit 28.

As shown in FIG. 6, accessory power supply 112 is preferably housed within tubular housing 106. However, accessory power supply 112 could be housed as part of the second magnetic detection computer 114.

Distal coil 26 (disposed at the outermost periphery from coil body 120) functions in a similar manner to the other magnetic field detecting poles indicated above, i.e., horizontal coil 98, x-axis coil 100, and y-axis coil 102. The incorporation of second magnetic detection computer 114 at a distal location from tubular housing 106 adds weight to coil body 120 thus assisting the release of the coil body 120 from the tubular housing 106 through gravity. In an alternative embodiment, coil body 120 could be ejected from tubular housing 106 through preloaded spring release.

Distal coil 26 is disposed about the outer periphery of coil body 120 and is electrically connected with second magnetic detection computer 114 through electrical connecting members 122. Distal coil 26 is flexible and is compressed for temporary storage within tubular housing 106 before deployment therefrom. Connection members 122 are provided with respective spring loaded hinges 124 at connection points with coil body 120 to allow temporary storage of distal coil 26 within tubular housing 106. Upon release from tubular housing 106, spring loaded hinges 124 are urged away from coil body 120.

Submarine evaluation accessory 104 houses an accessory power supply 112 and a second magnetic detection computer 114. Second magnetic detection computer 114 is disposed within coil body 120 and is released via bottom lid 116. As shown, bottom lid 116 is released about hinge 117, as indicated by arrow "c", to allow coil body 120 and therefore second magnetic detection computer 114 to be released from an interior cavity of tubular housing 106. Bottom lid 116 may be released through an electrical switch or a mechanical, i.e. pressure sensitive switch (not shown). Upon release, coil body 120 drops below tubular housing 106 and thereby unwinds electrical member 118. Electrical member 118 is preferably 150 feet in length and provides electrical connection between second magnetic detection computer 114 and electrical contacts 110 within tubular housing 106. Electrical member 118 is preferably a nylon cord wrapped by an insulated electrical wire. Second pole switch 156 disengages pole 26 by connecting same to ground during periods of radio transmission.

As shown with reference to FIG. 7, the relationship between second magnetic detection computer 114 and pole 26 is similar to that discussed above. Accessory power supply 112 supplies power to second current generator 150, which in turn supplies current to flux detecting sensor 152. Flux detecting sensor 152 transmits and regulates the amount of current which is transmitted about pole 26 for detection of the surrounding magnetic field. Flux detecting sensor 152 then communicates detected magnetic field information to second magnetic detection computer 114 by way of second analog-to-digital converter 154.

Second magnetic detection computer 114 controls pole 26 via second pole switch 156. Second pole switch 156 is used to disengage pole 26 during periods of radio transmission. Second magnetic detection computer 114 may instruct pole switch 156 to ground pole 26 if it is indicated that it is not attached or that it is sending erroneous information. Second detection computer 114 communicates with detection computer 36 to provide information as received from pole 26.

With reference now to FIG. 8, shallow water anchor assembly 126 is shown and described. Shallow water anchor assembly 126 may be optionally attached to bottom end 50 of basic unit 28. Shallow water assembly 126 is similar to submarine evaluation accessory 104 in that both accessories contain a number of similar parts which have been numbered accordingly.

Shallow water anchor assembly 126 is configured and arranged to house shallow water anchor 128. Shallow water anchor 128 is deployed through gravitational release from tubular housing 106 upon opening of bottom lid 116. Shallow water anchor 128 is released from tubular housing 106 and tethers from member 129 until it reaches the ocean bottom. Member 129 is preferably a nylon cord. Upon release of shallow water anchor 128 from tubular housing 106, anchor spikes 130 are urged apart from each other through spring loaded hinges 132. Shallow water anchor 128 then rests upon the ocean floor and thereby reduces drag or drift of buoy 10 from its dropped location.

In shallow water, the amount of space for a submarine to be located becomes limited. Nevertheless, there is often a concern that a submarine may be located in relatively shallow water near shore during the course of operation. Thus, the provision of distal coil 26 becomes less important. However, near shore, it becomes increasingly important that buoy 10 be maintained in a relatively stable position, for instance during choke point operations.

Generally, the operation of magnetic anomaly detection buoy 10 is as follows. Once the buoy 10 is activated through on/off switch 40, activation indicator 42 signals that the unit is operational and that the power supply 38 has sufficient charge. Buoy 10, along with a plurality of additional buoys, are then loaded into search aircraft 12. A decoder/frequency scanner onboard search aircraft 12 (not shown) is then activated.

Upon deployment of buoy 10, slipstream fin 64 catches the wind and thereby releases parachute 16. Buoy 10 impacts the ocean 14 and sinks to a predetermined level approximating 33 feet. Upon sensing a surrounding water pressure corresponding to 33 feet, pressure activated piston 80 is depressed. Compressed air cartridge 84 is then opened through release valve 82, thereby inflating float 18. Pressure activated piston 80 also sends an electrical signal to magnetic detection computer 36 to indicate that activation of the buoy 10 should commence.

In an alternative embodiment, pressure activated piston 80 sends an electrical signal to magnetic detection computer 36, for activation thereof, which in turn supplies an electrical signal to release valve 82 to commence the release of compressed air from compressed air cartridge 84 into float 18.

Upon receipt of an electrical signal from the pressure activated piston 80, magnetic detection computer 36 sends a number of electrical signals to the elements of buoy 10. An electrical signal is then sent from computer 36 to trigger the release of bottom lid 116 of submarine evaluation accessory 104. Power is then supplied from power supply 38, and an initialization signal is sent to solid state recorder 34 and radio transmitter 32. In an alternative embodiment, pressure activated piston 80 could supply the respective activation signals to respective components simultaneously along with an additional signal which is sent to the magnetic detection computer 36. No evaluation is undertaken during this initial procedure to avoid possible electrical spikes and interference from the electrical switching which takes place.

Upon the discharge of the compressed air into float 18, inflation takes place, barrier 76 is pushed outward, and buoy 10 begins its assent to the ocean surface. The buoy should float to the surface of the ocean within 20–40 seconds from activation of pressure activated piston 80, however this time period is not critical. Simultaneously, distal coil assembly 26 begins to release from tubular housing 106 and continues its decent until electrical member 118 is completely unraveled. Distal coil assembly 26 should reach its desired length within one and one-half to two minutes.

As the distal coil assembly 26 is unraveling from tubular housing 106, magnetic detection computer 36 directs that a radio signal status transmission (outlined below) be emitted via radio transmitter 32, and flexible antenna 88 to aircraft 12 for approximately 15 seconds.

Figure 9:
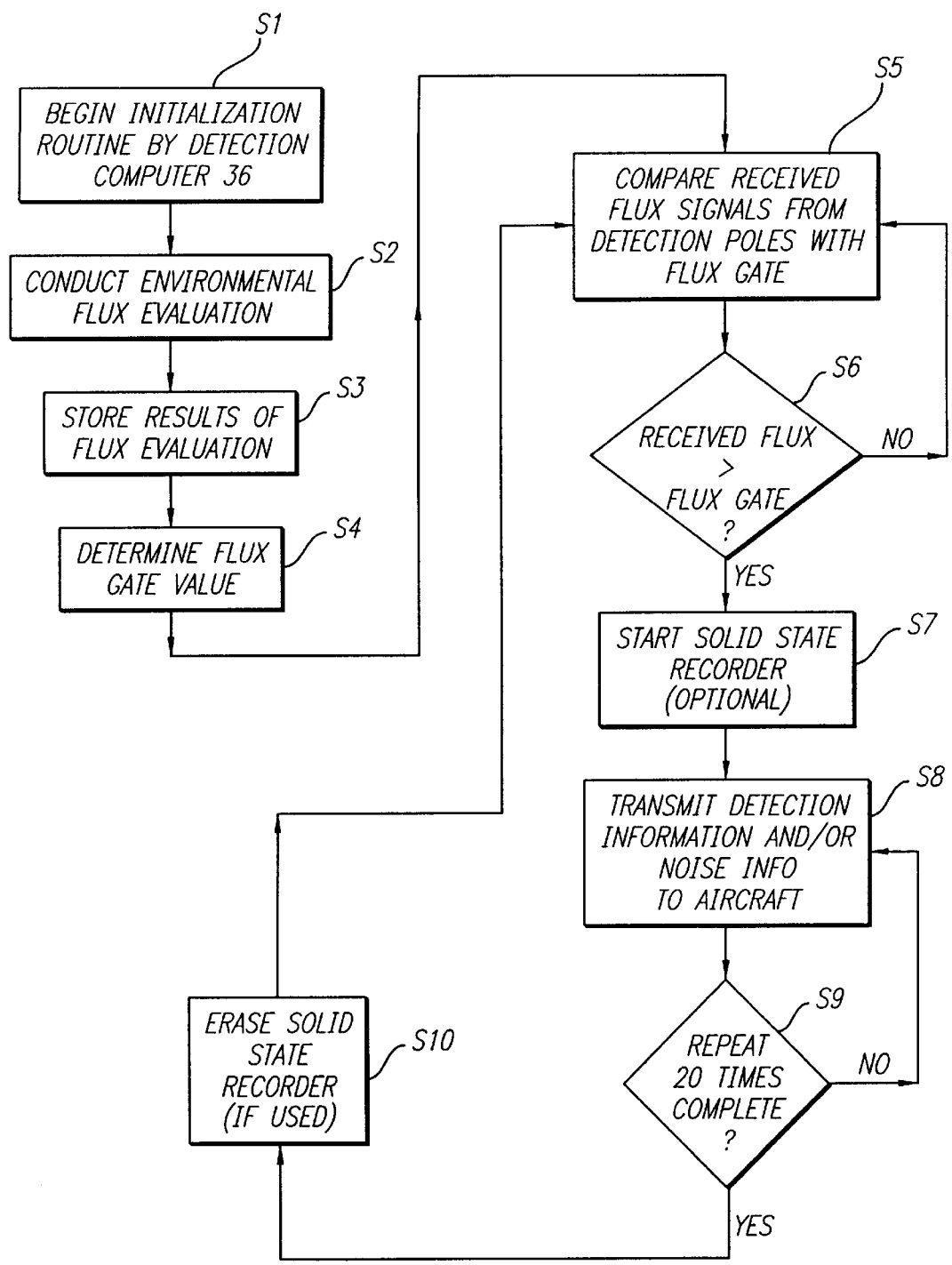
FIG. 9 is a flow chart showing operational steps of a magnetic detection computer in accordance with the present invention.

With reference now to FIG. 9, the operation of buoy 10 will now be shown and described. After the initialization routine is completed, magnetic detection computer 36 conducts an environmental magnetic flux evaluation for approximately five minutes. During this evaluation phase, magnetic detection computer 36 analyzes all electrical contacts (some of which connect with magnetic field detecting poles 98, 100, 102, and 26). If no signal is detected within two minutes, all electrical contacts are connected with ground. The failure to detect any signal indicates a mechanical failure; or in the case of distal coil 26, that submarine evaluation accessory 104 is not connected. This assists in information integrity and reduces the possibility for false signals and/or erroneous signals.

According to a preferred embodiment, information which is obtained during the environmental magnetic flux evaluation is temporarily stored in a RAM by magnetic detection computer 36. Next, detection computer 36 sets a flux gate such that a magnetic flux signal above the flux gate would indicate an anomaly. The flux gate may simply be a predetermined unit of flux above the highest recorded flux amount detected during the five minute environmental flux evaluation, or the flux gate may be determined using statistical averaging techniques. The flux gate information is then stored in detection computer 36 as part of a RAM and transmitted via radio signals to aircraft 12 as part of an environmental status string. The flux gate is then continually evaluated after a predetermined temporal interval which may be set or programmed by an operator.

Figure 10:
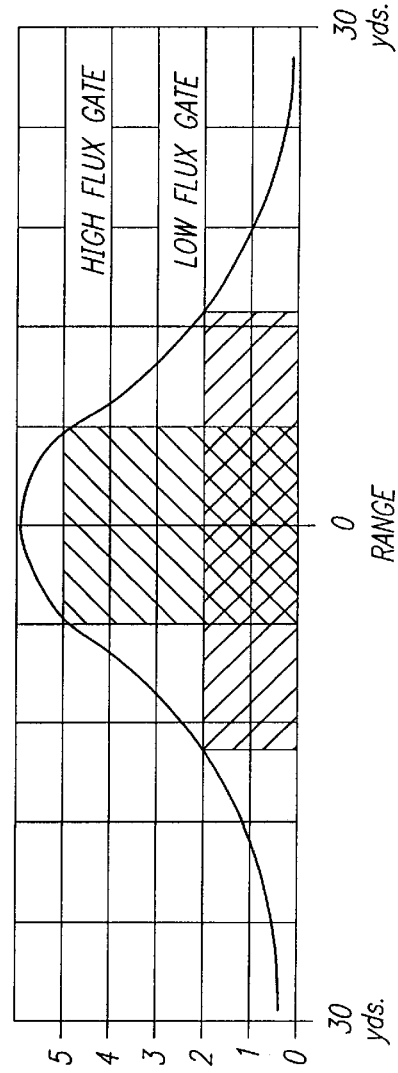
FIG. 10 is a diagram indicating relative flux gate and corresponding range of a magnetic anomaly.

With reference now to FIG. 10, a relative flux gate is shown and described. The flux gate is next determined during the initial environmental magnetic flux evaluation. The flux gate is set by magnetic detection computer 36. On the relative scale as shown by FIG. 10, a flux gate of "5" would indicate that the magnetic field surrounding buoy 10 is relatively strong. A flux gate of "2" would indicate that the magnetic field surrounding buoy 10 is relatively weak.

Each pole 98, 100, 102 and 26 has its own respective flux gate. After each respective flux gate is set, a reading of a magnetic flux which is greater than the flux gate will be received by detection computer 36. If the evaluated flux level from poles 98, 100, and 102 is simultaneously detected, then detection computer 36 transmits a signal indicating such information. Detection computer 36 may also receive a flux level from pole 26 and make a weighted evaluation with respect to the flux levels detected on poles 98, 100 and 102. If the flux level of pole 26 is significantly higher, then the presence of a submarine has been detected.

In an alternative embodiment, the environmental flux is re-evaluated every hour and transmitted to aircraft 12 through another environmental status string. However, this embodiment is not preferred since it is undesirable to have a large number of buoys simultaneously transmitting information. According to yet another embodiment, the surrounding environmental flux conditions are periodically evaluated with the flux gate corresponding to a weighted statistical average.

After the initialization and first environmental flux evaluation is complete, detection computer 10 continually monitors the flux as indicated by the magnetic field detecting poles (98, 100, 102, 26) and compares the values received with the flux gate value. If a value is received which exceeds the flux gate value, a transmission sequence is initiated to convey the anomaly detection information to aircraft 12. Detection computer 36 does not initiate a transmission unless an anomaly is detected. This allows the technicians aboard aircraft 12 to monitor a large number of buoys without requiring specific analysis of all background electromagnetic noise.

The flux gate as outlined above may actually comprise four separate flux gates, each corresponding to a respective detection pole. (Further, if a larger number of poles are required by varying embodiments of the present invention, corresponding flux gates may be so provided). In an alternative embodiment, the detection computer 10 may incorporate an algorithm or protocol for comparing all information received from the respective poles and then initiate a radio transmission in accordance therewith.

Upon detection of a magnetic anomaly, detection computer 36 will activate solid state recorder 34 and thereby record all ambient noise for approximately 30 seconds. In this embodiment, solid state recorder 34 may receive acoustical signals ambiently through housing 28 (by way of transducer 33 in FIG. 1, which may be a microphone contained therein) or via a hydrophone (not shown) for subsequent evaluation and/or transmission to aircraft 12. Next, detection computer 36 will command radio transmitter 32 to transmit signal code and ambient noise information for approximately 30 seconds with re-transmission at periodic intervals thereafter, preferably every 30 seconds. The radio transmissions should continue through a number of intervals, preferably 20 intervals. If further suspicious activity is not recognized, the solid state recorder 34 will be erased and detection computer 36 will return to standby or watch mode.

The information which is transmitted to aircraft 12 is coded to facilitate interface with a computer onboard the aircraft and to reduce the requirements of continual human intervention. The airborne computer or "black box" will continually scan various channels for detection of signals which are transmitted by the buoys such as buoy 10. Since buoy 10 only transmits upon the detection of an anomaly, and since the coded transmission indicates which buoy is signaling, multiple buoys may share the same frequency without interference.

An example of an initial status message according to the present invention is now shown with reference to FIG. 11. The information transmitted by radio transmitter 32 is preferably digital binary information. Each initial status message essentially contains nine units of information. However in a preferred embodiment the status message contains ten units of information to foster upgrade compatibility. The information outlined below is shown with roman numerals, however in practice, each unit of information would be represented by binary digital code. The original status message (15 sec.) transmitted by each individual buoy is unique and contains the following information:

TABLE I

| | |
|---|---|
| Unit No. 1: | buoy frequency channel number (1, 3, 5, ect.) which is a predetermined number preferably up to 99 |
| Unit No. 2–4 | buoy number, which is preferably a random preset from 001 to 999 |
| Unit No. 5–8 | blank information (to indicate that this is an original status message) |
| Unit No. 9 | checksum |
| Unit No. 10 | not shown (used for future upgrade) |

An example of an initial status message is shown in FIG. 8 and outlined in the following table:

TABLE II

| | Code Transmission Examples | | | | | | | | | |
|---|---|---|---|---|---|---|---|---|---|---|
| | 1 | 2 | 3 | 4 | 5 | 6 | 7 | 8 | 9 | 10 |
| Ex. 1 | 01 | 1 | 2 | 3 | 0 | 0 | 0 | 0 | 7 | N/A |
| Ex. 2 | 03 | 1 | 1 | 1 | 0 | 0 | 0 | 0 | 6 | N/A |
| Ex. 3 | 05 | 9 | 1 | 3 | 0 | 0 | 0 | 0 | 8 | N/A |

Thus, an original status message according to example 1 above would have a buoy frequency of "01"; indicate a transmission from buoy number "123"; provide blank information "000" to indicate that a status message is being transmitted; and a checksum of "7" (a checksum is simply a binary numerical addition of the status message to ensure the integrity of the data).

As shown in further reference to FIG. 9, a general magnetic anomaly detection message will have a similar format to the status message shown above with the following exceptions as outlined below:

TABLE III

| Unit No. 1: | buoy frequency channel number (1, 3, 5, ect.) which is a predetermined number preferably up to 99 |
|---|---|
| Unit No. 2–4 | buoy number, which is preferably a random preset from 001 to 999 |
| Unit No. 5 | Relative strength of anomaly as shown by table IV below |
| Unit No. 6–7 | Sequential number indicating transmission number (increments with each transmission from 01 to 20) |
| Unit No. 8 | Submarine Evaluation designation as given by table V below |
| Unit No. 9 | checksum |
| Unit No. 10 | not shown (used for future upgrade) | the relative strength of a detected anomaly is given by the following table:

TABLE VI

| Relative Strength of Anomaly | |
|---|---|
| 1 | Very Weak |
| 2 | Weak |
| 3 | Moderate |
| 4 | Strong |
| 5 | Very Strong | the evaluation which is performed by detection computer 36 is summarized in the following table:

TABLE V

| Submarine Evaluation Summary | |
|---|---|
| 0 | No Evaluation (evaluation accessory not attached) |
| 1 | Evaluation as surface anomaly (3 poles on float stronger than lower float) |
| 2 | Undetermined (3 float poles = lower single pole) |
| 3 | Submarine contact (3 poles on float have weaker anornaly than lower pole) |

With reference now to FIG. 12, the transmission cycle is now shown and described. Whenever the detection computer 36 determines that the presence of a submarine has been indicated, transmission is sent via radio transmitter 32. Each transmission last for 30 seconds with a 30 second break between transmissions. The break between transmissions allows the same frequency to be used by a number of different buoys while reducing the potential for interference. After 20 transmissions or 20 minutes, the buoy returns to "watch" mode.

The forgoing system is designed to operate for a limited period of time. After completion of the operation, which is selectable from a few hours up to a week, buoy 10 sinks to the bottom of the ocean to avoid interference with fishing lines, commercial traffic and other types of sonar equipment. A variety of means may be employed to submerse buoy 10 after completion of its operation. One means is a controlled air leak, another is a timed squib, and yet another is a dissolvable plug which corrodes in the presence of sea water.

The foregoing disclosure relates to only specific embodiments of the invention and numerous modifications of alterations may be realized by those skilled in the art without departing from the spirit and scope of the invention as set forth in the appended claims and any equivalents thereof.

I claim:

1. A magnetic anomaly detection buoy comprising:

an elongated body defining an interior cavity;

a magnetometer which produces an output in response to a detected magnetic anomaly;

a magnetic detection computer disposed within the cavity of the elongated body which measures the output from the magnetometer and produces an activation signal when the measured output exceeds a threshold value;

a transducer which detects acoustical information;

a solid state recorder disposed within the cavity of the elongated body which records the detected acoustical information in response to the activation signal from the magnetic detection computer; and an inflatable float which maintains the elongated buoy in a state of buoyant repose.

2. The magnetic anomaly detection buoy according to claim 1 further comprising:

a radio transmitter disposed within the cavity of the elongated body and in electrical communication with the magnetic detection computer for transmitting a radio signal corresponding to the detected magnetic anomaly.

3. The magnetic anomaly detection buoy according to claim 1 further comprising:

a radio transmitter disposed within the cavity of the elongated body and in electrical communication with the magnetic detection computer for transmitting a radio signal corresponding to the recorded acoustical information.

4. The magnetic anomaly detection buoy according to claim 1 further comprising:

a second magnetometer physically connected to the elongated body via an elongated tension member and producing an output in response to a detected magnetic anomaly;

wherein said second magnetometer is electrically coupled to the magnetic detection computer and the magnetic detection computer measures the output from the second magnetometer and produces a second activation signal when the measured output exceeds a second threshold value.

5. The magnetic anomaly detection buoy according to claim 4 further comprising:

a second magnetic detection computer electrically coupled with the second magnetometer for receiving an output therefrom and transmitting the output to the first magnetic detection computer.

6. The magnetic anomaly detection buoy according to claim 1, wherein the magnetometer comprises:

a first electrically conductive pole physically connected to the elongated body and having a first electrical connection;

a second electrically conductive pole physically connected to the elongated body and having a second electrical connection; and a third electrically conductive pole physically connected to the elongated body and having a third electrical connection;

wherein, said first, second and third electrical connection transmit first, second and third magnetic field information to the magnetic detection computer respectively from the first, second and third electrically conductive pole.

7. The magnetic anomaly detection buoy according to claim 5, wherein the magnetometer comprises:
 a fourth electrically conductive pole physically connected to the elongated body via an elongated tension member, said fourth electrically conductive pole having a fourth electrical connection;
 wherein, said fourth electrical connection transmits fourth magnetic field information to the magnetic detection computer from the fourth electrically conductive pole.

8. The magnetic anomaly detection buoy according to claim 1, wherein the magnetometer comprises a superconducting quantum interference device.

9. A magnetic anomaly detection buoy comprising:
 an elongated body defining an interior cavity;
 a first magnetic anomaly detector which produces a first output in response to a detected magnetic anomaly in a first plane of Euclidian space;
 a second magnetic anomaly detector which produces a second output in response to a detected magnetic anomaly in a second plane of Euclidian space;
 a magnetic detection computer disposed within the cavity of the elongated body which produces an activation signal when the first and second output from the first and second anomaly detectors exceed a threshold value;
 a transducer which detects acoustical information;
 a solid state recorder disposed within the cavity of the elongated body which records the detected acoustical information in response to the activation signal from the magnetic detection computer;
 a transmitter which transmits information corresponding to the first and second output in response to the activation signal; and
 an inflatable float which maintains the elongated buoy in a state of buoyant repose.

10. The magnetic anomaly detection buoy according to claim 9, further comprising:
 a radio transmitter disposed within the cavity of the elongated body and in electrical communication with the magnetic detection computer for transmitting a radio signal corresponding to the recorded acoustical information.

11. A magnetic anomaly detection buoy comprising:
 an elongated body defining an interior cavity;
 a first magnetic anomaly detector which outputs first magnetic field information in response to a detected magnetic anomaly;
 a second magnetic anomaly detector which outputs second magnetic field information in response to a detected magnetic anomaly, said second magnetic anomaly detector being physically connected to the elongated body via an elongated tension member;
 a magnetic detection computer which produces an activation signal when the first and second magnetic field information exceeds a threshold value;
 a transducer which detects acoustical information;
 a solid state recorder disposed within the cavity of the elongated body which records the detected acoustical information in response to the activation signal from the magnetic detection computer;
 a transmitter which transmits information corresponding to the first and second magnetic field information in response to the activation signal; and
 an inflatable float which maintains the elongated buoy in a state of buoyant repose.

12. The magnetic anomaly detection buoy according to claim 11, wherein the transmitter transmits a radio signal corresponding to the recorded acoustical information.

13. A magnetic anomaly detection buoy comprising:
 an elongated body defining an interior cavity;
 a magnetometer physically connected to the elongated body via an elongated tension member and producing an output in response to a detected magnetic anomaly;
 a magnetic detection computer disposed within the cavity of the elongated body which measures the output from the magnetometer and produces an activation signal when the measured output exceeds a threshold value;
 a transducer which detects acoustical information;
 a solid state recorder disposed within the cavity of the elongated body which records the detected acoustical information in response to the activation signal from the magnetic detection computer;
 a transmitter disposed within the cavity of the elongated body and in electrical communication with the magnetic detection computer for transmitting a signal corresponding to the detected magnetic anomaly in response to the activation signal; and
 an inflatable float which maintains the elongated buoy in a state of buoyant repose.

14. A magnetic anomaly detection buoy comprising:
 means for detecting and measuring a magnetic anomaly;
 means for producing an activation signal if the measured anomaly exceeds a threshold value;
 means for detecting acoustical information;
 means for recording the acoustical information in response to the activation signal; and
 means for maintaining the buoy in buoyant repose.

15. A magnetic anomaly detection buoy comprising:
 a first body defining a first cavity;
 a second body defining a second cavity;
 a float connected to the body to maintain the buoy in a state of buoyant repose;
 a first magnetic anomaly detector disposed within the float to produce a first output in response to a detected magnetic anomaly in a first plane of Euclidian space;
 a flexible member connecting the first body to the second body;
 a second magnetic anomaly detector disposed within the second body to produce a second output in response to a detected magnetic anomaly in a second plane of Euclidian space;
 a magnetic detection computer electrically connected to the first magnetic anomaly detector and the second magnetic anomaly detector to produce an activation signal when the first and second outputs from the first and second magnetic anomaly detectors exceed a predetermined threshold value; and
 a transmitter to transmit information corresponding to the first and second outputs in response to the activation signal.

16. The magnetic anomaly detection buoy according to claim 15, further comprising:
 a third magnetic anomaly detector to produce a third output in response to a detected magnetic anomaly in a third plane of Euclidian space,
 wherein the magnetic detection computer is electrically connected to the third magnetic anomaly detector and produces the activation signal when the first, second and third outputs from the first, second and third magnetic anomaly detectors exceed the predetermined threshold value.

17. The magnetic anomaly detection buoy according to claim 16, wherein the third magnetic anomaly detector is disposed within the float.

18. The magnetic anomaly detection buoy according to claim 17, further comprising:

a fourth magnetic anomaly detector to produce a fourth output in response to a detected magnetic anomaly in a fourth plane of Euclidian space, wherein the magnetic detection computer is electrically connected to the fourth magnetic anomaly detector and produces the activation signal when the first, second, third and fourth outputs from the first, second, third and fourth magnetic anomaly detectors exceed the predetermined threshold value.

19. The magnetic anomaly detection buoy according to claim 15, further comprising:

a radio transmitter disposed within the cavity of the first body and in electrical communication with the magnetic detection computer to transmit a radio signal corresponding to the detected magnetic anomaly.

20. A magnetic anomaly detection buoy comprising:

a first body defining a cavity;

a float to maintain said first body in a state of buoyant repose;

a first magnetic anomaly detector disposed within said float to output first magnetic field information in response to a detected magnetic anomaly;

a second body connected to said first body via a flexible tension member;

a second magnetic anomaly detector disposed within said second body to output second magnetic field information in response to a detected magnetic anomaly;

a magnetic detection computer to produce an activation signal when the first and second magnetic field information exceeds a predetermined threshold value; and a transmitter to transmit information corresponding to the first and second magnetic field information in response to the activation signal.

21. The magnetic anomaly detection buoy according to claims 20, wherein the first and second magnetometer each comprise a superconducting quantum interference device.

22. The magnetic anomaly detection buoy according to claim 20, further comprising:

a solid state recorder disposed within the cavity of said first body to record acoustical information in response to the activation signal from said magnetic detection computer.

23. A magnetic anomaly detection buoy comprising:

means for producing a first output in response to a first detected magnetic anomaly in a first plane of Euclidian space;

means for producing a second output in response to a second detected magnetic anomaly in a second plane of Euclidian space;

means for producing an activation signal when the first and second output exceed a threshold value;

means for transmitting information corresponding to the first and second output in response to the activation signal;

means for maintaining the buoy in buoyant repose, wherein said means for producing a first output is connected to said means for producing a second output by a flexible tension member.

24. A magnetic anomaly detection buoy having a body defining an interior cavity, comprising:

a first magnetometer to produce a first output in response to a first detected magnetic anomaly;

a second magnetometer physically connected to the elongated body via a flexible tension member to produce a second output in response to a second detected magnetic anomaly;

a magnetic detection computer disposed within the cavity to measure the first and second outputs and to produce an activation signal when either of the first or second outputs exceeds a threshold value;

a transmitter disposed within the cavity to transmit a signal corresponding to the first or second detected magnetic anomalies in response to the activation signal; and a float to maintain said elongated buoy in buoyant repose.

25. The magnetic anomaly detection buoy according to claim 24, further comprising:

a second magnetic detection computer electrically coupled with said second magnetometer to receive the second output and transmit the second output to the first magnetic detection computer.

26. The magnetic anomaly detection buoy according to claim 24, wherein the first magnetometer comprises:

a first pole physically connected to the body and having a first electrical connection;

a second pole physically connected to the body and having a second electrical connection; and a third pole physically connected to the body and having a third electrical connection, wherein, said first, second and third electrical connections transmit first, second and third magnetic field information to the first magnetic detection computer respectively from the first, second and third electrically conductive poles.

* * * * *